United States Patent [19]

Claisse

[11] Patent Number: 5,086,195
[45] Date of Patent: Feb. 4, 1992

[54] PROFILE WITH TWO FITTINGLY ENGAGEABLE PARTS, IN PARTICULAR A DUCT HAVING A BODY AND A COVER

[75] Inventor: Jean-Jacques Claisse, Crepy En Valois, France

[73] Assignee: Planet Wattohm, Senlis, France

[21] Appl. No.: 521,385

[22] Filed: May 10, 1990

[51] Int. Cl.$^5$ .............................................. H02G 3/04
[52] U.S. Cl. .................................. 174/101; 174/68.3; 174/97
[58] Field of Search ...................... 174/68.3, 72 A, 97, 174/101; 138/157, 162, 163, 92; D13/155

[56] References Cited

U.S. PATENT DOCUMENTS

| | | | |
|---|---|---|---|
| 1,277,550 | 9/1918 | Connell | 138/163 X |
| 3,024,301 | 3/1962 | Walch | 174/72 A |
| 3,890,459 | 6/1975 | Caveney | 174/101 |

FOREIGN PATENT DOCUMENTS

| | | | |
|---|---|---|---|
| 1136665 | 12/1956 | France | 174/97 |
| 2536219 | 5/1984 | France | 174/101 |
| 2593973 | 8/1987 | France | 174/101 |
| 2622956 | 5/1989 | France | 174/101 |
| 1153183 | 5/1969 | United Kingdom | 174/68.3 |

OTHER PUBLICATIONS

"Panduit Electrical Components", Catalog WC-1, Published by Panduit Corporation, Tinley Park, Illinois, Bulletin D-2a, Revised Apr. 1961, pp. 2 and 4, Received in U.S. PTO on Jul. 30, 1963.

Primary Examiner—Morris H. Nimmo
Attorney, Agent, or Firm—Longacre & White

[57] ABSTRACT

This profiled member is of the kind comprising two parts engageable with each other, for example a body part (10) and a cover part (11). There are provided on a baseplate (12) of the body part (10) snap-fastener members to enable the cover part (11) to be attached to the body part (10) in either of two separate positions, its normal service position and another position. The profiled member is particularly suitable for ducts or trunking of electrical wiring.

4 Claims, 1 Drawing Sheet

PROFILE WITH TWO FITTINGLY ENGAGEABLE PARTS, IN PARTICULAR A DUCT HAVING A BODY AND A COVER

The present invention is generally concerned with profiled members.

It is more particularly directed to extruded profiled members comprising two longitudinal parts that can be engaged with each other by snap-fastener means provided between them for this purpose.

This is the case, for example, with ducts (trunking) used to house and protect electrical conductors, or conduits.

These ducts comprise one part forming a body which, to define a housing compartment, features in practise a baseplate and two lateral flanges, the lateral flanges possibly having apertures at intervals to bring out the electrical conductors or conduits concerned, formed by cut-outs entailing a punching operation after extrusion, and a part forming a cover adapted in service to close the previously described body part.

For some profiled members of this type, and this is the case with ducts of relatively small transverse cross-section, it has already been proposed to use the same extrusion die to extrude both component parts, the die comprising to this end two spaced passages with the contours of the respective parts.

It has also been proposed to assemble the two parts together after extrusion, as soon as they have cooled sufficiently.

At present such assembly can only be performed for the normal service position of the cover part.

In other words, after such assembly, the cover part inevitably closes the body part with which it is associated.

For the manufacturer this arrangement has the two-fold advantage of simultaneous production and common packaging for both parts of the profiled member concerned, the combination resulting in practise in a significant increase in productivity.

However, at present this method cannot be used for profiled members having a relatively large transverse cross-section.

There are two reasons for this.

Firstly, if apertures are to be cut into the lateral flanges of the body part, the cover part when fitted to the body part impedes the work of the cutting tool.

Also, if the combination is packaged with the cover part fitted to the body part, the wasted space quickly becomes prohibitive.

The document United Kingdom Pat. No. 1,153,183 proposes a profiled member comprising two separate compartments disposed back-to-back in a very specific manner, each with its own access, and, in practise on the lateral flanges of these two compartments, duplicated snap-fastener means adapted to enable attachment thereto of a cover part, so that the two compartments can be closed by similar cover parts.

A general object of the present invention is an arrangement which utilizes duplicated snap-fastener means of this kind and provides a very simple way to overcome the difficulties explained above in relation to profiled members of the kind concerned.

To be more precise, the object of the invention is a profiled member of the kind comprising two parts engageable with each other by snap-fastener means provided between them to this end, for example a body part and a cover part adapted in service to close the body part, the body part comprising two sets of snap-fastener means for attaching the cover part to it, characterized in that, in the case of a duct of which the body part comprises a baseplate and two flanges, with at the free edges of the lateral flanges snap-fastener means adapted for attaching the cover part to it in service, the baseplate of the body part also comprises snap-fastener means for attaching the cover part to it so that the cover part may be attached to the body part it in either of two separate positions, its normal service position and another position.

The snap-fastener means provided in this way on the baseplate of the body part are used for the assembly operation carried out after extrusion.

In other words, this assembly operation attaches the cover part to the back of the baseplate of the body part, instead of attaching it to the lateral flanges of the latter, as is the usual case in service.

In this position the cover part does not impede in any way the operation of the tools for cutting apertures into the lateral flanges.

What is more, it leaves the interior volume of the body part totally open so that, for packaging the combination, a "head-to-tail" arrangement can be advantageously adopted, with the benefit of a significant reduction in the corresponding overall volume which is impossible when, as is the case in the normal in-service position, the cover part covers the open side of this internal volume.

In this way the advantages of simultaneous production and common packaging are retained without the disadvantages, irrespective of the dimensions of the transverse cross-section of the profiled member concerned.

Nothing comparable is suggested in the document United Kingdom Pat. No. 1,153,183, in which the only possible equivalent of a baseplate is the common back of the two compartments of the corresponding profiled member, this back not being provided with any snap-fastener means.

The characteristics and advantages of the invention will emerge from the following description given by way of example with reference to the appended diagrammatic drawings in which.

Figure 1:
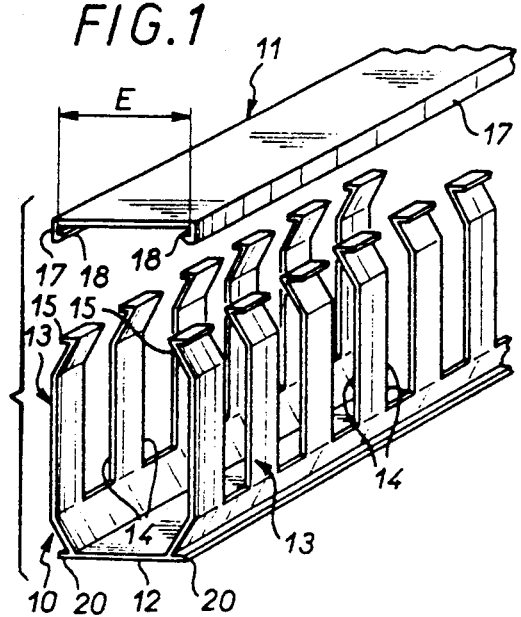
FIG. 1 is an exploded perspective view of a profiled member to which the invention is applicable.

These figures show by way of example the application of the invention to a duct for housing electrical conductors, or conduits (not shown).

Taken overall, a duct of this kind constitutes a profiled member comprising two parts which can be manufactured individually by extrusion, for example, from any appropriate synthetic material; they can be engaged with each other by snap-fastener means provided between them for this purpose and in practise formed by these two parts themselves.

To be more precise, these parts comprise one part forming a body 10 and another part forming a cover 11 adapted in service to close the body part 10.

In the embodiment shown in FIGS. 1 through 4 the body part 10 comprises, delimiting a compartment, a baseplate 12 and two lateral flanges 13 along respective longitudinal edges of the baseplate 12.

To be even more precise, in this embodiment each of the lateral flanges 13 comprises cut-outs 14 spaced at regular intervals and in corresponding relationship to each other, being of generally rectangular shape, for example, as shown here, and extending transversely over at least part of their height from their free edge.

In a way that is known in itself it is at this free edge of the lateral flanges 13 of the body part 10 in the embodiments shown that there are provided the snap-fastener means adapted to enable the associated cover part 11 to be attached in service to the body part 10.

In the embodiment shown the snap-fastener means on the body part 10 comprise two lips 15 generally parallel to the baseplate 12 and extending in opposite directions from the free edges of the lateral flanges 13, being locally interrupted from place to place by the cut-outs 14 in the latter.

In the embodiment shown in FIGS. 1 through 4 the cover part 12 is in the form of a simple plate the width of which is comparable with that of the baseplate 12 of the body part 10 and the snap-fastener means that it comprises for attaching it to the body part 10 are formed by two parallel ribs 17 which are hook-shaped in transverse cross-section, projecting along respective longitudinal edges of its lower surface with the beads on the ribs 17 forming the hooks 18 directed towards each other.

Figure 2:
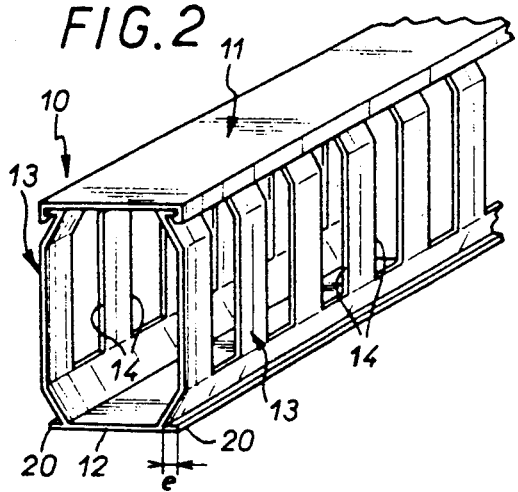
FIG. 2 is a perspective view analogous to that of FIG. 1 for the normal in-service position of the two component parts of this profiled member.

As is easy to understand and as is shown in FIG. 2, in the normal service position and by virtue of temporary elastic deformation of the lateral flanges 13 of the body part 10, the hook-shaped profile ribs 17 of the cover part 11 are engaged with the body part 10, the beads 18 on the hook-shaped profile ribs 17 engaging under the lips 15 on the side flanges 13 of the body part 10.

These arrangements are well known in themselves and as they do not of themselves form any part of the present invention they will not be described in more detail here.

Figure 4:
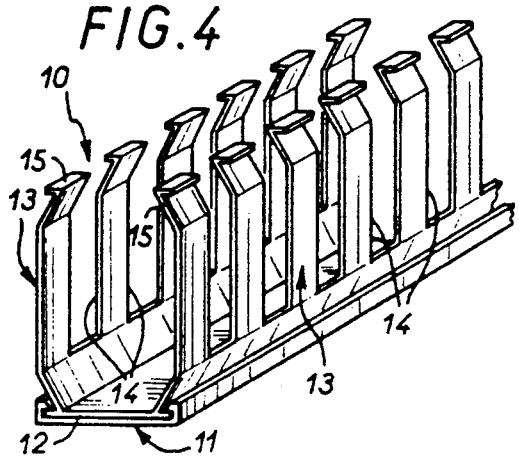
FIG. 4 is a perspective view analogous to that of FIG. 2 showing the other of the positions authorized by the invention for the component parts of the profiled member concerned.

In accordance with the invention, the body part 10 comprises two sets of the snap-fastener means for attaching to it the cover part 11, so that said cover part 11 can be attached to it in either of two separate positions, its normal service position (FIG. 2) and a different position (FIG. 4).

To be more precise, below the lateral flanges 13 as previously described the baseplate 12 of the body part 10 comprises further snap-fastener means for attaching to it the cover part 11.

In the embodiment specifically shown in FIGS. 1 through 4 these snap-fastener means are formed by two lateral extensions 20 of the baseplate 12 projecting from the roots of respective lateral flanges 13 with the same separation E as the hook-shaped profile ribs 17 on the cover part 11.

To be more precise, in this embodiment the lateral extensions 20 that the baseplate 12 of the body part 10 comprises are in the plane of the baseplate 12.

In other words, the baseplate 12 projects beyond the lateral flanges 13 by an amount e corresponding on each side to the width of the lateral extension 20 and it is by virtue of the corresponding edges, the distance between which is the same as the distance E between the hook-shaped profile ribs 17 on the cover part 11, that it forms directly and of its own accord the snap-fastener means adapted to enable the cover part 11 to be attached to it.

In practise the thickness of the baseplate 12 and of its lateral extension 20 is similar or identical to that of the lips 15 on the lateral flanges 13 and the height of the hook-shaped profile ribs 17 on the cover part 11 is determined in consequence of this.

In practise, the lateral flanges 13 have a trapezium-shaped profile in transverse cross-section in the embodiment shown, with their concave sides facing towards each other, to increase the available volume within the compartment that the body part 10 delimits.

This arrangement is by no means imperative, however, and it must not be regarded as limiting the invention.

Figure 3:
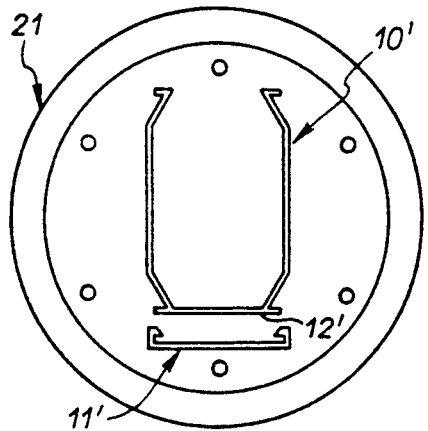
FIG. 3 is an elevation view of the die used to extrude this profiled member.

As shown in FIG. 3, the body part 10 and the cover part 11 may advantageously be extruded by the same die 21 having two passages 10', 11' one above the other each adapted to extrude a respective part.

However, in accordance with the invention the passage 10' for extruding the body part 10 is above the passage 11' for extruding the cover part 11' with its concave side facing the same way.

In other words, the passage 11' is to the side of the part 12' of the passage 10' corresponding to the formation of the baseplate 12 of the body part 10 and has its concave side facing towards the part 12'.

Thus when the cover part 11 is assembled to the body part 10 after extrusion, such assembly is to the back of the baseplate 12 of the body part 10, as shown in FIG. 4.

Figure 5:
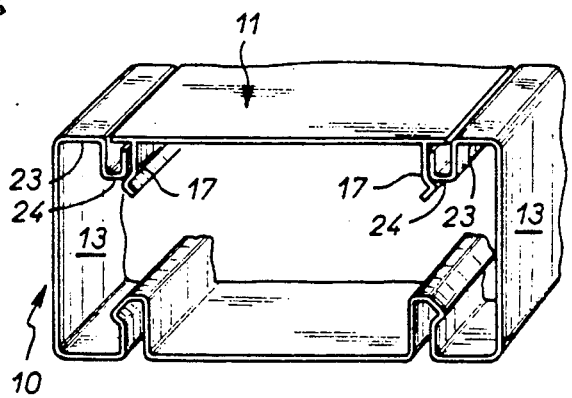
FIGS. 5 and 6 are perspective views respectively analogous to FIGS. 2 and 4 showing the application of the invention to another type of profiled member.
Figure 6:
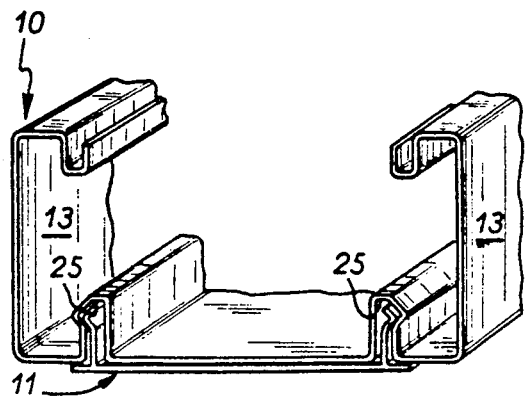

FIGS. 5 and 6 show the application of the invention to the case where the lateral flanges 13 of the body part 10 have at their free edges respective lips 23 directed towards each other and the hook-shaped profile ribs 17 on the corresponding cover part 11 are designed to cooperate snap-fastener fashion with channels 24 at the edges of the lips 23 and facing towards each other.

As these arrangements are well known in themselves, they will not be described in more detail here, for the reasons previously explained.

In accordance with the invention the snap-fastener means that the body part 10 comprises for attaching to it the cover part 11 in a position other than the normal service position of the latter are formed by two grooves 25 recessed into the outside surface of the baseplate 12 the same distance apart as the hook-spaced profile ribs 17 on the cover part 11 and having a profile which is complementary to that of the hook-shaped profile ribs 17.

As previously, the cover part 11 can therefore be attached to the back of the baseplate 12 of the body part 10 after extrusion, as shown in FIG. 6.

Of course, the present invention is not limited to the embodiments described and shown but encompasses any variant execution.

Also, the field of application of the invention is not limited to that of ducts as specifically described and shown but extends more generally to any type of ducts and more generally still to any type of profiled member formed from two parts engageable with each other by snap-fastener means provided between them for this purpose.

I claim:

1. A profiled trunking member comprising a generally U-shaped body member and a cover part, said body member including a baseplate, two lateral flanges projecting from opposed sides of said baseplate, an opening defined between free ends of said lateral flanges remote from said baseplate, first and second snap-fastening means being provided proximate said baseplate and said free ends of the lateral flanges respectively, said first snap-fastening means being defined by extensions of said baseplate extending beyond junctions with the respective lateral flanges, the extensions and said baseplate lying in a common plane, said cover part having cooperable snap-fastening means selectively detentingly engageable with said first and second snap-fastening means, said cooperable snap-fastening means comprising two inwardly directed hook-shaped members projecting from an underside of said cover part, the distance between the extension on said baseplate and the hook-shaped members being equal, said cover part having a first or packing position in which said cooperable snap-fastening means are in engagement with said first snap-fastening means and said cover part at least partially overlies said baseplate while leaving the lateral flanges substantially entirely uncovered, said cover part having a second or service position in which said cooperable snap-fastening means are in engagement with said second snap-fastening means for closing off said opening, each of said lateral flanges comprising a planar central panel and marginal panels to each side thereof, the marginal panels of each lateral flange being inclined away from the plane of the respective central panel and towards the other lateral flange so as to define substantially bowed lateral flanges.

2. A profiled trunking member comprising a generally U-shaped body member and a cover part, said body member including a baseplate, two lateral flanges projecting from opposed sides of said baseplate, an opening defined between free ends of said lateral flanges remote from said baseplate, first and second snap-fastening means being provided proximate said baseplate and said free ends of the lateral flanges respectively, said first snap-fastening means being defined in recessed grooves opening onto an outer surface of said baseplate, said cover part having cooperable snap-fastening means selectively detentingly engageable with said first and second snap-fastening means, said cooperable snap-fastening means comprising two generally parallel hook-shaped ribs facing each other and projecting from an underside of said cover part, said grooves having contours complementary to those of said hook-shaped ribs, said grooves being spaced from each other a distance equal to the spacing of said hook-shaped ribs, said cover part having a first or packing position in which said cooperable snap-fastening means are in engagement with said first snap-fastening means and said cover part at least partially overlies said baseplate while leaving the lateral flanges substantially entirely uncovered, said cover part having a second or service position in which said cooperable snap-fastening means are in engagement with said second snap-fastening means for closing off said opening.

3. A profiled member according to claim 2, wherein the free ends of said lateral flanges are generally S-shaped and extend towards each other, said second snap-fastening means being defined by portions of the S-shaped free edges remote from said lateral flanges projecting away from said baseplate.

4. A profiled member according to claim 2, wherein said profiled member is an extrusion, said first or packing position being an immediate post-extrusion position.

* * * * *